(12) United States Patent
Ebihara et al.

(10) Patent No.: US 8,376,500 B2
(45) Date of Patent: Feb. 19, 2013

(54) IMAGE RECORDING APPARATUS, METHOD OF CALCULATING RECORD POSITION SHIFTS, AND METHOD OF RECORDING MEASURED PATTERNS

(75) Inventors: Toshiyuki Ebihara, Hachioji (JP); Takeo Ogama, Hachioji (JP)

(73) Assignee: Riso Kagaku Corporation, Tokyo (JP)

( * ) Notice: Subject to any disclaimer, the term of this patent is extended or adjusted under 35 U.S.C. 154(b) by 298 days.

(21) Appl. No.: 12/785,690

(22) Filed: May 24, 2010

(65) Prior Publication Data
US 2010/0302303 A1 Dec. 2, 2010

(30) Foreign Application Priority Data
May 27, 2009 (JP) ................................ 2009-127917
Feb. 24, 2010 (JP) ................................ 2010-039081

(51) Int. Cl.
*B41J 29/393* (2006.01)

(52) U.S. Cl. .................. 347/19; 347/5; 355/28

(58) Field of Classification Search .................. 347/5, 9, 347/14, 15, 19; 355/28
See application file for complete search history.

(56) References Cited

U.S. PATENT DOCUMENTS 5,523,823 A * 6/1996 Ashikaga ........................ 399/28
7,419,230 B2 9/2008 Tatsuta et al.

FOREIGN PATENT DOCUMENTS

WO WO 03/082587 A1 10/2003

* cited by examiner

*Primary Examiner* — Lam S Nguyen
(74) *Attorney, Agent, or Firm* — Holtz, Holtz, Goodman & Chick, PC

(57) ABSTRACT

An image recording apparatus records a plurality of measuring patterns on a recording medium. Each measuring pattern is constituted by dots spaced from one another on the recording medium, or by dots contacting one another, forming lines spaced from one another on the recording medium. Further, the measuring patterns have gravity centers are almost identical in position on the recording medium. Hence, the relative record shifts of the measuring patterns recorded by recording element arrays, respectively, can be decreased.

7 Claims, 12 Drawing Sheets

IMAGE RECORDING APPARATUS, METHOD OF CALCULATING RECORD POSITION SHIFTS, AND METHOD OF RECORDING MEASURED PATTERNS

CROSS-REFERENCE TO RELATED APPLICATIONS

This application is based upon and claims the benefit of priority from prior Japanese Patent Applications No. 2009-127917, filed May 27, 2009; and No. 2010-039081, filed Feb. 24, 2010, the entire contents of both of which are incorporated herein by reference.

BACKGROUND OF THE INVENTION

1. Field of the Invention

The present invention relates to an image recording apparatus designed to record images by using recording heads, each having a plurality of recording elements arranged in an array, a method of calculating shifts of record positions of images, and a method of recording measured patterns.

2. Description of the Related Art

In general, image recording apparatuses, such as ink jet printers, have a recording head that has a plurality of recording elements arranged, forming an array, and discharges ink to a recording medium being carried, thereby recording an image on the recording medium. Any color printer has, for example, four nozzle arrays arranged in the direction of carrying a recording medium and configured to discharge inks of four different colors, respectively, thereby to record a color image.

In such an image recording apparatus, ink drops discharged from each recording element, array will land the recording mediums at wrong positions if the recording element array is held at a wrong position or if the ink drops are discharged at a wrong time. Consequently, the color images of different colors will shift from one another, blurring the edges of the color image or lowering the quality of the color image due to the spreading of color inks.

In order to eliminate such shifts of image positions, thereby to record a high-quality color image, the direction and distance in and by which the color images of different colors shift in position must be measured. A method of measuring the shifts of image positions is proposed in, for example, Patent Document 1. In this method, a prescribed measuring pattern is recorded (or printed) and photographed, generating image data. This image data is processed by a computer, thereby calculating the direction and distance in and by which the color images of different colors shift in position.

In this method, a black-ink recording head unit 16k and a cyan-ink recording head 16c are driven, at every two other nozzles, as is shown in FIG. 17A. As a result, first measuring patterns p1 and p2 are recorded on a recording medium, as shown in FIG. 17B. The measuring patterns p1 and p2, each being an array of dots, extend parallel to each other, in the direction orthogonal to the direction in which the recording medium is carried. The first pattern p1 is constituted by black ink dots, while the second pattern p2 by cyan ink dots. All ink dots shown in FIG. 17B assume correct positions on the recording medium, because they have been formed by an image recording apparatus perfectly adjusted. In practice, however, ink dots assumes positions shifted from those positions shown in FIG. 17B.

A second example of the method will be explained with reference to FIGS. 18A and 18B. FIG. 18A shows the black-ink recording head unit 16k and cyan-ink recording head 16c.

FIG. 18B shows two patterns p11 and p12, each being an array of dots, extend parallel to each other, in the direction in which the recording medium is carried. The pattern p11 is recorded by the head unit 16k, while the pattern p12 by the head unit 16c. On the recording medium, a pattern p13 is formed, which is constituted by the patterns p11 and p12. The measuring pattern shown in FIG. 18B indicates the positions the dots assume when the color images of different colors do not shift at all. Each dot is spaced apart from any other so that its coordinates may be determined well. In this case, the recording element arrays shown in FIG. 18A are driven, at every two other nozzles, recording a color image.

Next, in order to determine the coordinates of each dot from these patterns, the patterns p1 and p2 or the patterns p11 and p12, photographed by a read unit, are input to a computer. The computer generates image data that can be processed.

The read unit that reads the patterns is, for example, such a flat bed scanner 101 shown in FIG. 19. The flat bed scanner 101 has a housing 102 and a line sensor 104. The housing 102 has a reading surface 103. On the reading surface 103, the recording medium having the patterns p1 and p2 or patterns p11 and p12 is set. The line sensor 104 scans the recording medium, in scanning direction n, reading the patterns p1 and p2 or patterns p11 and p12 or acquiring them as image data. The image data is processed, using the image processing technique known in the art, determining the coordinates of each of the dots constituting the patterns p1 and p2 or patterns p11 and p12.

To calculate the direction and distance in and by which the two patterns p1 and p2 or patterns p11 and p12 shift, the coordinates of the gravity center of each of the patterns p1 and p2 or patterns p11 and p12 are calculated as points representing the positions of the patterns. Note that the gravity center is a point that represents the position of the pattern. In this case, the coordinates of the gravity center is the average of the coordinates values of the dots constituting each pattern (p1, p2, p11 or p12), or so-called "average coordinates."

FIG. 17B illustrates the case where the patterns p1 and p2 have gravity center G1 and gravity center G2, respectively. The shift between the position of the gravity center G1 of the pattern p1 and the position of the gravity center G2 of the pattern p2 is determined. The patterns p1 and p2 are recorded at correct positions, or do not have a recording position shift (zero shift) if their gravity centers are identical on the x axis and spaced apart by a prescribed distance on y axis as is shown in FIG. 17B.

If the pattern p2 shifts to the right from the pattern p1 in the state shown in FIG. 17B, the shift of the gravity center G2 on the x axis with respect to the gravity center G1 assumes a positive value. If the pattern p2 shifts upwards from the pattern p1 in the state shown in FIG. 17B, the shift of the gravity center G2 on the y axis with respect to the gravity center 51 assumes a positive value. The direction in which the recording element arrays extend is not always orthogonal to the direction in which the recording medium is carried. In view of this, the direction in which the recording medium is carried during the image recording is defined as y-axis direction, and the direction of carrying the recording medium is x-axis direction.

In FIG. 18B, the patterns p11 and p12 similarly have gravity center oil and gravity center G12, respectively. In FIG. 18B, the y axis defines the direction in which the recording medium is carried during the image recording, and the x axis orthogonal to the y axis defines the direction in which the recording element arrays are adjusted in position. The shift between the gravitation center G12 of the pattern p12 and the gravitation center G11 of the pattern p11 is then determined.

If the gravity centers of the measuring patterns p11 and p12 are spaced apart by a prescribed distance L in the x-axis direction as shown in FIG. 18B, no recording shifts exist, or the recording error is zero. In this state, if the pattern p12 shifts to the right from the pattern p11, the shift of the gravity center G12 on the x axis with respect to the gravity center G11 assumes a positive value. If the pattern p12 shifts upwards from the pattern p11 in the state shown in FIG. 18B, the shift of the gravity center G11 on the y axis with respect to the gravity center G12 assumes a positive value.

In the image recording apparatus, the positions of the recording element arrays and the timing of recording an image is adjusted so that the relative shift between the recording positions of the measuring patterns may be reduced to zero in terms of the relative position shift.

In order to determine the distances by which the measuring patterns shift in the x-axis direction or y-axis direction at high accuracy, it is important to mount the recording medium on the reading surface in a correct orientation so that the direction in which the recording medium is carried during the image recording may be aligned with the direction in which the line sensor scans the medium during the image reading.

In order to determine, at high accuracy, the distance L between the gravity centers G11 and G12, as measured in the x-axis direction, in such a state as shown in FIG. 18B, the scale the imaging apparatus has must be accurate. If the scale has an error of ±E %, the distance determined will be erroneously determined to be L×(100±E)/100. This error increases as the distance L between the gravity centers G11 and G12 increases.

BRIEF SUMMARY OF THE INVENTION

According to an aspect of embodiments, there is provided an image recording apparatus includes: a measuring pattern recording unit having a plurality of recording element arrays, each composed of recording elements configured to record ink dots on a recording medium, configured to move the recording medium relative to the recording element arrays, and to drive the recording elements of each recording element array, thereby recording a prescribed measuring pattern; a read unit configured to read the measuring patterns recorded on the recording medium; and a record-position shift calculating unit configured to calculate relative record shifts of the measuring patterns, from reading results acquired by the read unit, wherein the measuring pattern recording unit records measuring patterns on the recording medium such that gravity centers of the measuring patterns are identical in position on at least one of first and second coordinate axes, the first coordinate axis being parallel to a direction in which the recording medium is moved relative to the recording element arrays, and the second coordinate axis being parallel to a direction in which the recording element arrays are adjusted in positron.

Furthermore, the embodiments provides a method of calculating record position shifts includes: recording measuring patterns on a recording medium, each pattern constituted by a plurality of dots spaced from one another, by using a plurality of recording element arrays, each composed of recording elements configured to record dots; reading the measuring patterns recorded on the recording medium; and calculating relative record shifts of the measuring patterns, from reading results acquired in reading the measuring patterns, wherein the measuring patterns are recorded on the recording medium such that the dots constituting each measuring pattern are spaced from the dots constituting any other measuring pattern, and gravity centers of the measuring patterns are identical in position on the recording medium.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of this invention will be described in detail, with reference to the accompanying drawings.

Figure 1:
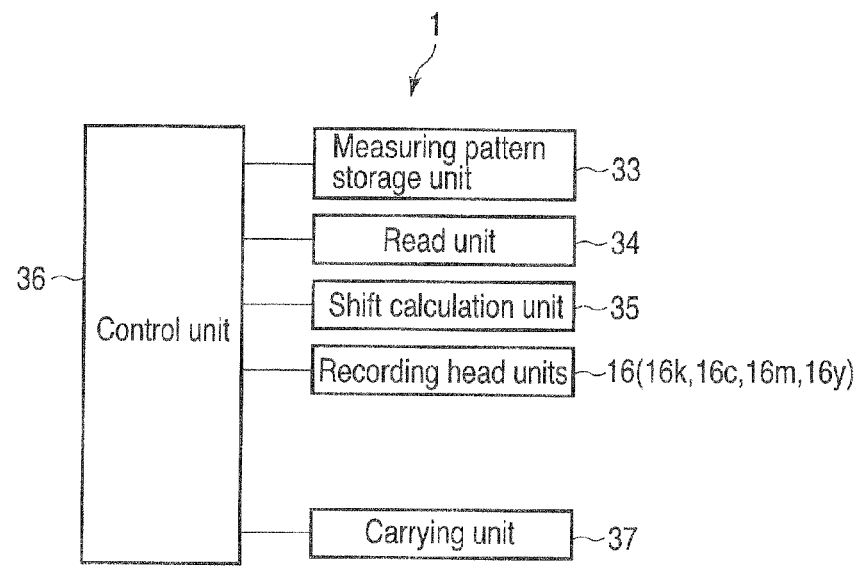
FIG. 1 is a block diagram showing an exemplary configuration of an image recording apparatus according to a first embodiment of this invention.
Figure 2:
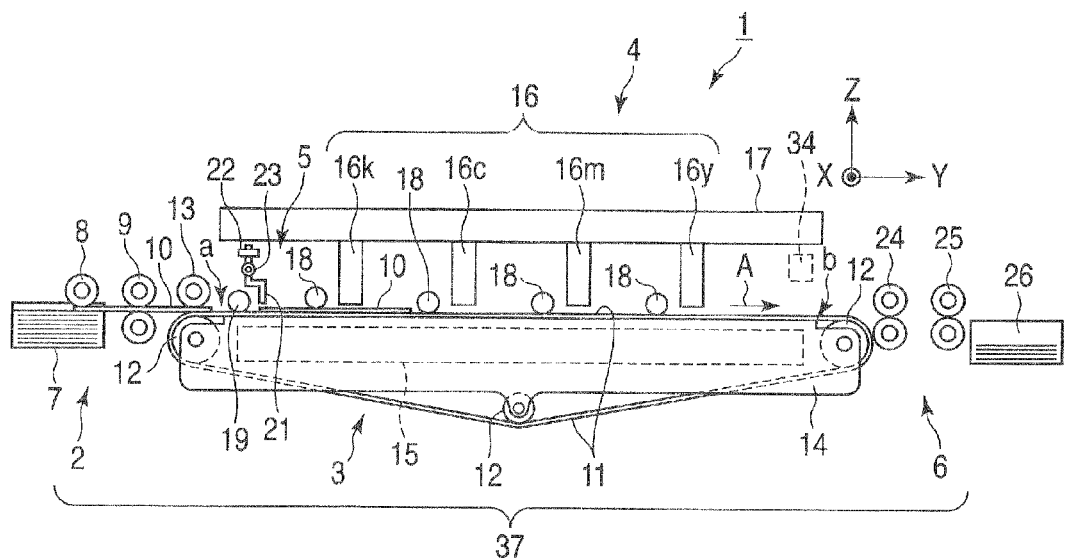
FIG. 2 is a side view of the carrying mechanism and image recording unit of the image recording apparatus according to the first embodiment.

FIG. 1 is a block diagram showing an exemplary configuration of an image recording apparatus according to a first embodiment of this invention. FIG. 2 is a side view of the carrying mechanism and image recording unit of the image recording apparatus according to the first embodiment.

As shown in FIG. 1, the image recording apparatus 1 is composed mainly of a measuring pattern storage unit 33, a read unit 34, a shift calculation unit 35, control unit 36, and a carrying unit 37.

As shown in FIG. 2, the carrying unit 37 has a sheet feeding unit 2, a platen unit 3, and a sheet ejection unit 6. In FIG. 2, the carrying direction A in which a recording medium 10 is carried [relative motion direction] is y axis, the direction orthogonal to the y axis in that surface of the medium 10, on which an image is formed during the image recording, is x axis, and the direction orthogonal to both the x axis and the y axis, i.e., so-called "upward-downward direction," is Z axis. In FIG. 2, arrow A indicates the direction in which the recording medium 10 is carried, from upstream toward downstream. Hereinafter, the recording medium 10 is carried shall be referred to as "carrying upstream side," and the other side of the recording medium 10 is carried shall be referred to as "carrying downstream side."

The measuring pattern storage unit 33 stores image data items necessary for printing measuring patterns. The image data items include those representing the positions of dots constituting each measuring pattern. The control unit 36 controls the carrying unit 37, causing the same to carry a recording medium 10. At the same time, the measuring pattern data is read from the measuring pattern storage unit 33 by the control unit 36 reads. In accordance with the measuring pattern data thus read, the recording head units 16k, 16c, 16m and 16y of the carrying unit 37 are driven, recording measuring patterns on the recording medium 10.

The recording medium 10, with measuring patterns printed on it, is set in the read unit 34 (either manually or automatically). Controlled by the control unit 36, the read unit 34 reads the measuring patterns, generating image data. The image data is sent to the shift calculation unit 35. The shift calculation unit 35 refers to the image data, calculating position the shifts of the measuring patterns. In this embodiment, the read unit 34 is constituted by, for example, a scanner of ordinary type, and is not formed integral with the main unit of the image recording apparatus. The shift calculation unit 35 is constituted by, for example, a central processing unit (CPU) or a personal computer (not shown) and stores programs, for calculating the position shifts of the measuring patterns.

The sheet feeding unit 2 has a recording medium tray 7, a pickup roller 8, and a pair of registration roller 9. The recording medium tray 7 can hold recording media 10 cut to, for example, A4 size. In this embodiment, the tray 7 holds recording media 10, e.g., cut sheets of paper. Nonetheless, the sheet feeding unit 2 may hold a roll of paper, which is cut into sheets of a prescribed size. Alternatively, the sheet feeding unit 2 may be configured to feed a continuous paper sheet. Note that if the unit 2 feeds a continuous sheet, a registration roller pair 9 and an upward-curling detection unit 5, both later described, can be dispensed with.

The pickup roller 8 of the sheet feeding unit 2 is a mechanism configured to take the recording media 10, one by one, from the recording medium tray 7. The pickup roller 8 is supported by the frame (not shown) of the main unit (image recording apparatus 1, as in the following) and can rotate around its axis.

The registration rollers 9 of the sheet feeding unit 2 are supported by the frame (not shown) of the main unit. Either registration roller 9 can rotate around its axis. The registration rollers 9 constitute a carry direction adjusting unit, which corrects, for example, the slanting of the recording medium 10 fed by the pickup roller 8, with respect to the direction in which the medium 10 is carried (i.e., y-axis direction). The pair of registration rollers 9 not only position the recording medium 10, but also transfers the recording medium 10 to the platen unit 3 at the time the image recording is started.

The platen unit 3 is a carrying mechanism configured to receive the recording medium 10 from the sheet feeding unit 2 and to carry the recording medium 10 through a path located below the recording head units 16k, 16c, 16m and 16g. As shown in FIG. 2, the platen unit 3 has a platen belt 11, platen halt rollers 12, a following roller 13, a platen frame 14, and recording medium suction unit 15.

The platen belt 11 of the platen unit 3 is an endless belt. It cooperates with the platen belt rollers 12, carrying the recording medium 10 along the y axis. The recording medium 10 is carried by the platen belt 11, in a carrying region that extends from point a to point b. The platen belt 11 and the platen belt rollers 12 are so arranged to carry the recording medium 10 from the upstream side of the platen unit 3 to the downstream side thereof, in the direction of arrow A, during the normal image recording. The platen belt 11 can, of course, be driven in reverse direction for the maintenance or for eliminating an operating error, if any.

The following roller 13 of the platen unit 3 abuts on the upstream side of the platen belt 11, is arranged, opposing the platen belt roller 12 across the platen belt 11 in the axis direction, and therefore prevents the recording medium 10 from curling upwards.

The image recording apparatus 1 has an image recording unit 4, which is arranged near the upper surface of the platen belt 11.

The image recording unit 4 is configured to discharge ink to the recording medium 10, thereby to record (or print) an image or measuring patterns on the recording medium 10. The image recording unit 4 is composed of recording head units 16 (16k, 16c, 16m and 16y) and a head frame 17 supporting these head units 16. Each recording head unit 16 has an image-recording element array, which has nozzles arranged in a column. Ink drops are discharged from the nozzles to record an image on the recording medium 10. Hereinafter, the nozzles so arranged shall be referred to as "nozzle column" or "recording element array."

Each recording head used in this embodiment is either a stationary line head having a recording element array longer than the width of the recording medium (the array defines an image recording region), or a line head composed of short recording heads arranged in staggered fashion, along the width of the recording medium, each having an recording element array shorter than the width of the recording medium. Alternatively, each recording head may be one (serial-type recording head), which is mounted on a carriage that moves to scan the recording medium as will be described later.

This embodiment has recording head units 16, each configured to discharge ink of specific color. If four inks of different colors are used, the embodiment has four recording head units 16k, 16c, 16m and 16y. The recording head units 16k, 16c, 16m and 16y discharge black ink, cyan ink, magenta ink and yellow ink, respectively. The four recording head units 16 are arranged, each spaced apart from any another in the direction of carrying the recording medium 10. The recording head units 16 are stationary line heads, each having a nozzle column longer than the width of the largest recording medium. Hence, if the largest recording medium on which the apparatus 1 can record images is an A3-size sheet, the nozzle column is longer than the A3-size sheet is broad.

In the present embodiment, four second sheet guides 18 are arranged, respectively at the upstream sides of the four recording head units 16. The second sheet guides 18 are hollow cylindrical rollers, each supported at both sides by the frame (not shown) of the main unit and allowed to rotate around its axis. The second sheet guides 18 are as long as, or longer than, the width of the largest recording medium used in the image recording apparatus 1. Arranged at the upstream sides of the four recording head units 16, respectively, the second sheet guides 18 prevent the recording medium 10 from curling upwards. This helps to carry the recording medium 10 toward the downstream side of the carrying region, smoothly though the path located below the recording head units 16.

The upward-curling detection unit 5 is composed of a first sheet guide 19, a curling detection plate 21, and a sensor 22.

In this embodiment, the first sheet guide 19 is arranged at the upstream side of the recording head unit 16k, which in turn is located more upstream than any other recording head unit. The first sheet guide 19 is shaped like a roller, supported at both ends by the frame (not shown) of the main unit and allowed to rotate around its axis. The first sheet guide 19 is as long as, or longer than, the width of the largest recording medium used in the image recording apparatus 1.

The curling detection plate 21 is pivotally supported by a move rotationally pin 23 and can rotate around the pin 23. The upper end part of the curling detection plate 21 is opposed to the sensor 22. The sensor 22 is an optical sensor of transmission type. The curling detection plate 21 has a straight lower edge, which lies near the medium carry surface of the platen belt 11 of the platen unit and is spaced apart (in Z-axis direction) from the medium carry surface by a prescribed distance. The recording medium 10 may touch the curling detection plate 21. In this case, the curling detection plate 21 rotates around the pin whereby the sensor 22 is activated, detecting that the recording medium 10 is curling upwards.

The sheet election unit 6 is arranged at the downstream side of the platen unit 3 and that of the image recording unit 4. The sheet ejection unit 6 is a mechanism configured to eject, from the main unit of the apparatus 1, any recording medium 10 on which an image has been recorded by the image recording unit 4. As shown in FIG. 1, the sheet election unit 6 has a pair of carrying rollers 24, a pair of ejection rollers 25, and an ejected medium tray 26.

The transport rollers 24 receive the recording medium 10 carried from the platen unit 3 and carry the same to the ejection rollers 25. The ejection rollers 25 receive the recording medium 10 from the transport rollers 24 and eject the same onto the ejected medium tray 26.

A method of determining an image forming position in this embodiment will be explained, with reference to the flowchart of the FIG. 3.

First, the control unit 36 reads the measuring pattern data from the measuring pattern storage unit 33. The control unit 36 then controls the recording head units 16k, 16c, 16m and 16y, the carrying unit 37, etc., whereby the measuring patterns represented by the data read from the measuring pattern storage unit 33 are recorded (printed) on the recording medium 10 (Step S1).

Next, the recording medium 10 having the measuring patterns recorded on it is set in the read unit 34. The control unit 36 controls the read unit 34, causing the same to read the measuring patterns recorded on the recording medium 10 and generate image data (Step S2).

Further, the control unit 36 sends the image data output from the read unit 34, to the shift calculation unit 35. The shift calculation unit 35 calculates position shift from the image data (Step S3).

Figure 4:
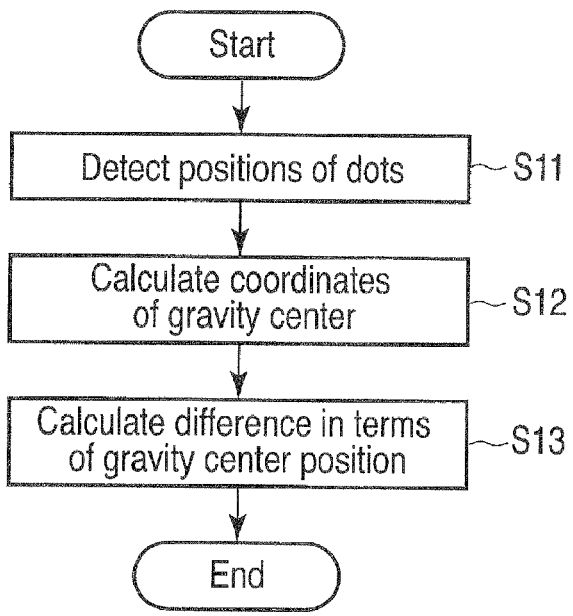
FIG. 4 is a flowchart showing the sub-routine of calculating position shifts, which is shown in FIG. 3.

A sub-routine of calculating the position shifts will be explained with reference to the flowchart of FIG. 4.

First, the shift calculation unit 35 reads, from of the dots that constitute each measuring pattern (positions of the dots) (Step S11). Then, the shift calculation unit 35 calculates the average value of the coordinates (positions) of dots, thereby finding the gravity center (average coordinates) of each measuring pattern (Step S12) Finally, the shift calculation unit 35 calculates the difference between the measuring patterns in terms of the position of the gravity center, thus determining the position shift of each measuring pattern with respect to any other measuring pattern (Step S13).

Figure 6:
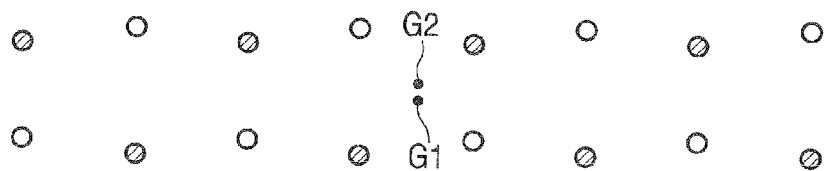
FIG. 6 is another diagram showing the exemplary measuring patterns for use in the first embodiment.

In the present embodiment, the position shift such two-color measuring patterns as shown in FIG. 6 have with respect to each other is measured, the patterns recorded on the same rearing region of a medium 10 by using two recording element arrays, respectively.

Figure 5:
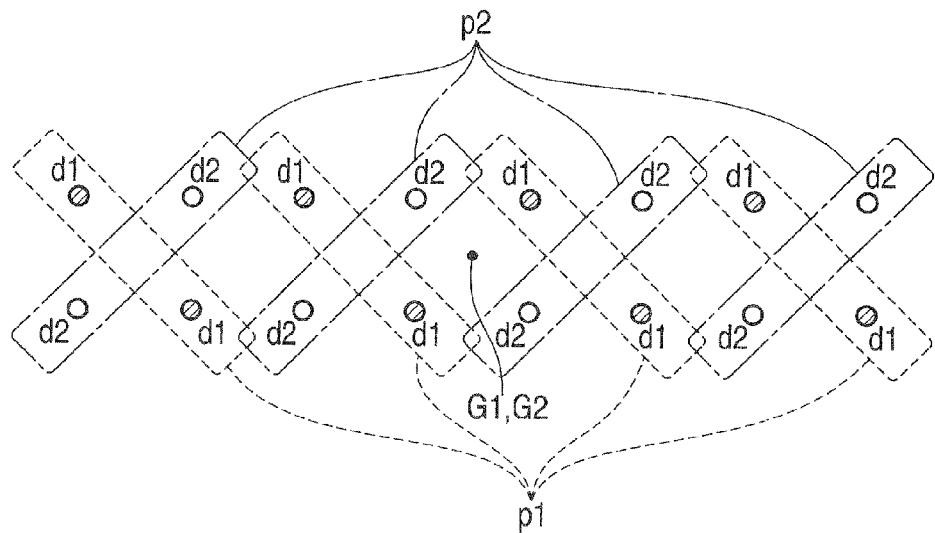
FIG. 5 is a diagram showing exemplary measuring patterns for use in the first embodiment.

FIG. 5 shows exemplary measuring patterns for use in the present embodiment. In FIG. 5, d1 indicates the dots constituting a measuring pattern p1 recorded by the recording head unit 16k, and d2 indicates the dots constituting a measuring pattern p2 recorded by the recording head unit 16c.

The gravity center G1 of the measuring pattern p1 is the average coordinate value of the dots constituting the measuring pattern p1. The gravity center G2 of the measuring pattern p2 is the average coordinate value of the dots constituting the measuring pattern p2. The dots constituting the measuring patterns p1 and p2 are printed and arranged on the recording medium 10 so that the gravity centers G1 and G2 may more approach than the dots constituting the patterns p1 and p2, and more preferably may assume the same position. In this embodiment, dots d1 and dots d2 of each measuring pattern are alternately arranged in a staggered fashion. Further, the dots of the pattern p1 are arranged in a different way from those of the pattern p2.

As shown in FIG. 5, the dots constituting the measuring pattern p2 are arranged symmetric with respect to the gravity centers G1 and G2. Note that FIG. 5 shows the measuring patterns p1 and p2 arranged in an ideal state, not shifted from each other, with their gravity centers G1 and G2 being identical in terms of coordinates.

Figure 7:
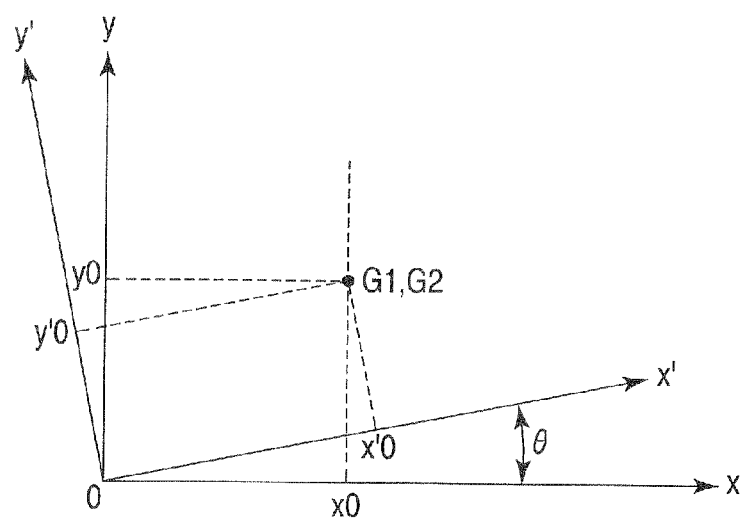
FIG. 7 is a diagram illustrating the principle of decreasing the errors made during the calculation of the position shifts, because of the inclination during the image reading.

FIG. 7 shows two coordinates systems, i.e. system xy and system x'y'. In the coordinates system xy, the gravity centers G1 and G2 of the respective measuring patterns p1 and p2 recorded on the recording medium lie at the intersection of the direction in which the recording element array extends and the direction in which the recording medium is carried, during the image recording. In the coordinates system x'y', the gravity centers G1 and G2 lie at the intersection the direction in which the line sensor extends and the direction in which the recording medium is scanned, during the image reading.

The two gravity centers G1 and G2 shown are identical in terms the X ordinate and the Y ordinate, in both the coordinates system xy for the image recording and the coordinates system x'y' for the image reading, which inclines by angle θ to the coordinates system xy. Therefore, even if the measuring patterns are read, with an angle shift between the direction in which the line sensor scans the medium 10 in the read unit and the direction in which the medium recorded with the measuring patterns is arranged, no errors of reading the positions of two gravity centers G1 and G2 will be made. Hence, the relative position shift of the measuring patterns can be accurately determined.

As a practical matter, the ink drops land the recording medium at wrong positions as shown in FIG. 6, because the recording head units 16k and 16c are displaced from the design positions, the recording timing shifts from the desirable one or the ink discharging speed changes from the prescribed value.

Figure 17A:
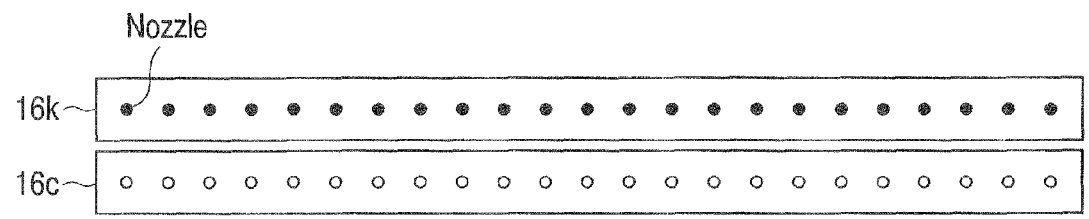
FIG. 17A is a diagram schematically showing two recording element arrays for discharging inks of different colors.
Figure 17B:
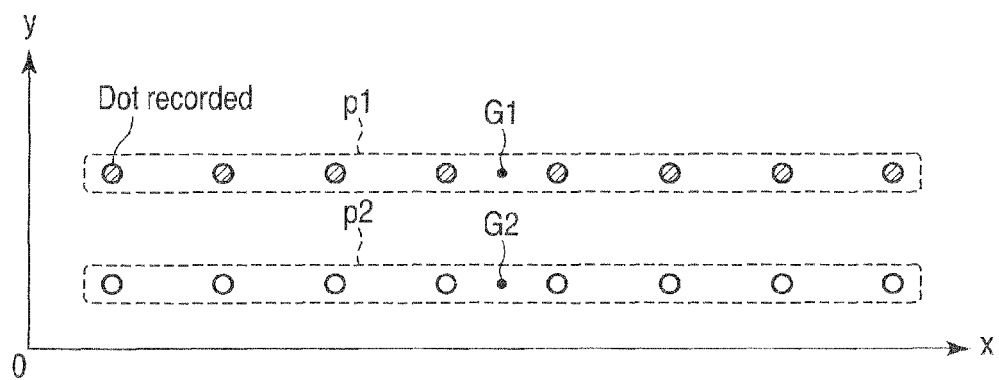
FIG. 17B is a diagram showing exemplary measuring patterns known in the art.

Even if ink drops land the recording medium at wrong positions, however, the distance between the gravity centers G1 and G2 of the measuring patterns p1 and p2 is shorter than the distance between the gravity centers of the conventional measuring patterns shown in FIG. 17B, a seen from FIG. 6. (That is, the relative position shift is smaller.) The reduction of the distance between the gravity centers decreases the reading error resulting from the fact that the direction in which the line sensor extends and the direction in which the recording medium is scanned, during the image reading are different from the direction in which the recording element array extends and the direction in which the recording medium extend and is carried, during the image recording. How the reading error is decreased will be explained with reference to FIG. 8.

Figure 8:
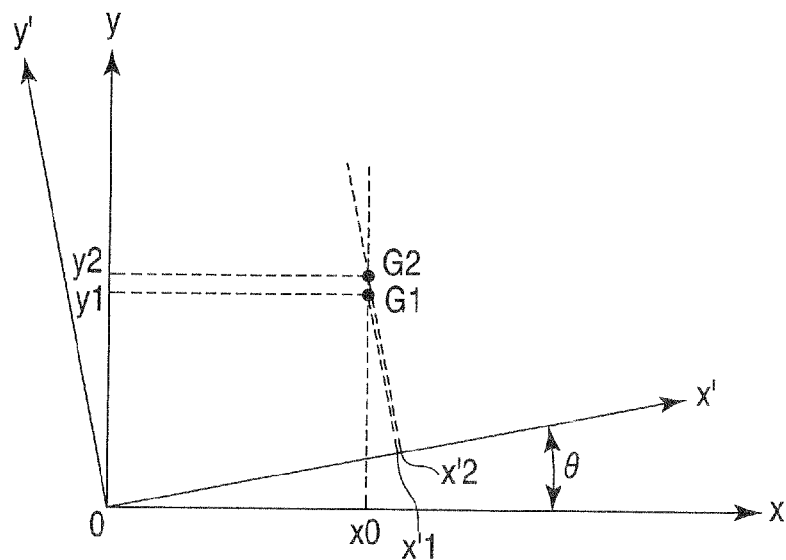
FIG. 8 is another diagram illustrating the principle of decreasing the errors made during the calculation of the position shifts, because of inclination.

FIG. 8 shows two coordinates systems xy and x'y'. In the coordinates system xy, the gravity centers G1 and G2 lie at the intersection of the direction in which the recording element array extends and the direction in which the recording medium is carried, during the image recording. In the coordinates system x'y', the gravity centers G1 and G2 lie at the intersection of the direction in which the line sensor extends and the direction in which the recording medium is scanned, during the image reading.

In the coordinates system xy pertaining to the image recording, the x ordinates of both gravity centers G1 and G2 are at point x0 and are therefore identical in position. That is, the position shift of one gravity center with respect to the other in the x-axis direction is 0. In the coordinates system x'y' pertaining to the image reading, which inclines by angle θ to the coordinates system xy, the x ordinate of the gravity center G1 is at point x'1, whereas the x ordinate of the gravity center G2 is at point x'2.

Figure 20:
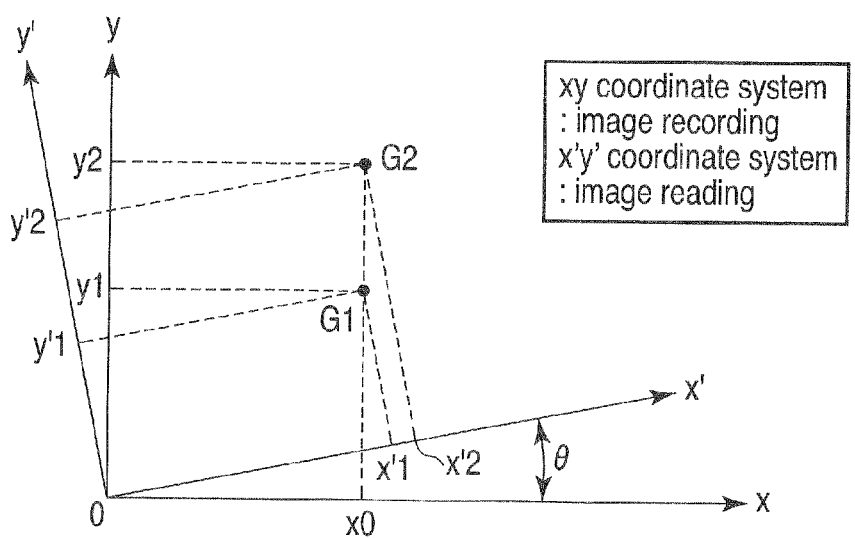
FIG. 20 is a diagram illustrating the principle of the errors made during the calculation of the position shifts, because of inclination.

In the present embodiment, the distance between point y1 and point y2 is shorter than in the conventional configuration shown in FIG. 20. Therefore, the distance between point x'1 and x'2 is shorter, too. That is, the position shift of the gravity center G2 with respect to the gravity center G1, in the x-axis direction, is small. This means that errors are hardly made.

In this embodiment, measuring patterns for detecting the position error of the ink drops discharged from the nozzles of each recording head and applied to a recording medium are so formed that the gravity center of the dots constituting one measuring pattern identical or almost identical to the gravity center of any other measuring pattern.

With this embodiment, the error resulting from the fact that the direction in which the line sensor extends and the direction in which the recording medium is scanned, during the image reading, differ from the direction in which the recording element array extends and the direction in which the recording medium extend and is carried, during the image recording, can be decreased in the image data acquired by first recording the measuring patterns on the recording medium and then reading the measuring patterns. Therefore, the recording positions can be adjusted at high precision.

In this embodiment, the measuring patterns p1 and p2 are so recorded that the dots d1 constituting the pattern p1 are spaced apart from the dots d2 constituting the measuring pattern p2. Nonetheless, it is not absolutely necessary to set the dots d1 apart from the dots d2. Assume that the recording head unit 16c that discharges cyan ink records the measuring pattern p1 and the recording head unit 16y that discharges yellow ink records the measuring pattern p2, and the read unit 34 is a scanner that has R, G and B channels, and the B channel alone can detect yellow ink and the R channel alone can detect cyan ink. Then, each cyan dot d1 and each yellow dot d2 may overlap on the recording medium.

An image recording apparatus according to a second embodiment of this invention will be described.

In the image recording apparatus according to the first embodiment, the gravity centers of the measuring patterns are positioned as close as possible or at the same point, thereby to adjust the recording positions at high precision. In the image recording apparatus according to the second embodiment, particular coordinates are set at the same point on a certain coordinate axis, thereby to adjust the recording positions at high precision. Flow the recording positions are adjusted in this way will be explained, using the same reference numbers for the components identical to those of the first embodiment.

Figure 3:
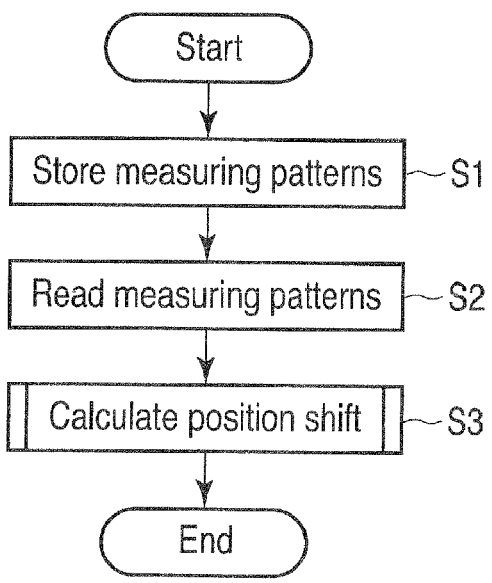
FIG. 3 is a flowchart showing the process sequence performed in the first embodiment.

In the method of determining an image forming position in this embodiment, for use in the image recording apparatus according to the first embodiment, the measuring patterns are recorded on the recording medium 10 (Step S1), and the measuring patterns recorded are read (Step S2), exactly in the same way as in the first embodiment (see the flowchart of FIG. 3). The position shift is calculated in Step S3, in a different way. That is, the control unit 36 sends the image data output from the read unit 34, to the shift calculation unit 35. The shift calculation unit 35 calculates a position shift from the image data.

Figure 9:
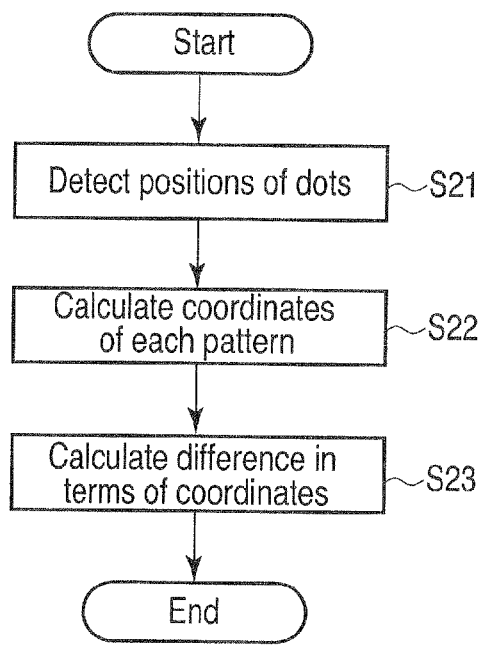
FIG. 9 is a flowchart showing the process sequence of calculating shifts in position, performed in a second embodiment of the invention.
Figure 10A:
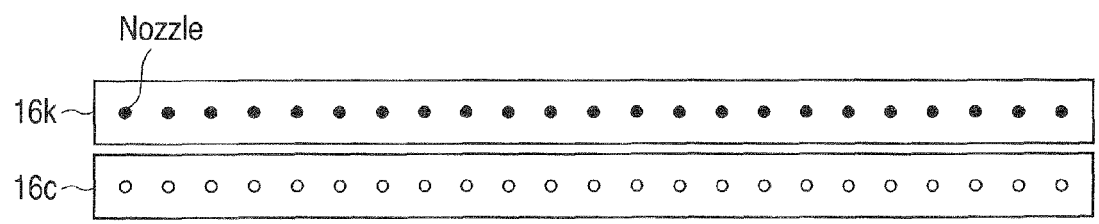
FIG. 10A is a diagram schematically showing two recording element arrays.
Figure 10B:
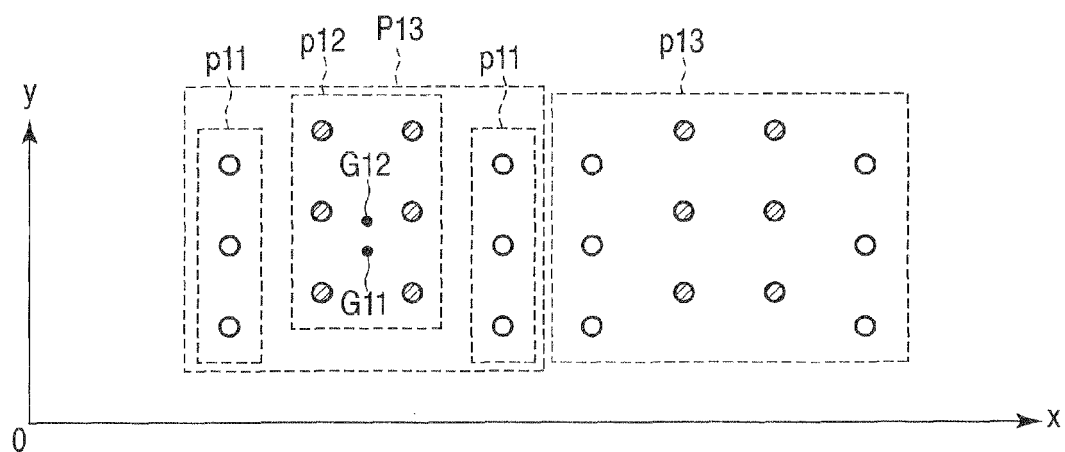
FIG. 10B is a diagram showing exemplary measuring patterns for use in the second embodiment.

The sub-routine of calculating the position shifts will be explained with reference to the flowchart of FIG. 9. FIG. 10A is a diagram schematically showing two recording element arrays that discharge inks of different colors. FIG. 10B is a diagram showing exemplary measuring patterns for use in the present embodiment.

The shift calculation unit 35 reads, from the image data, measuring patterns p11 and p12 and detects the coordinates of the dots constituting each measuring pattern (Step S21). Then, the shift calculation unit 35 calculates the average value of the coordinates of dots, thereby finding the coordinates of each measuring pattern (Step S22). Finally, the shift calculation unit 35 calculates the difference between the measuring patterns in terms of the position of each pattern (Step S23). The position shift of each measuring pattern with respect to any other measuring pattern is thereby calculated.

In this embodiment, the position shift between two measuring patterns formed in the same region of a recording medium 10 by two recording element arrays discharging inks of different colors, is measured. The measuring pattern p11 shown in FIG. 10B has been recorded by the recording element array of the recording head unit 16k, and the measuring pattern p12 shown in FIG. 10B has been recorded by the recording element array of the recording head unit 16c. These measuring patterns p11 and p12 form a measuring pattern p13 on the recording medium 10.

In this embodiment, the x-axis coordinate of the gravity center G11 of the measuring pattern p11 is identical to the x-axis coordinate of the gravity center G12 of the measuring pattern p12. Therefore, the distance L between the gravity centers G11 and G12, as measured in the x-axis direction, is 0 as long as the recording element array of the recording head unit 16k shift in the x-axis direction from that of the recording head unit 16k.

Figure 18A:
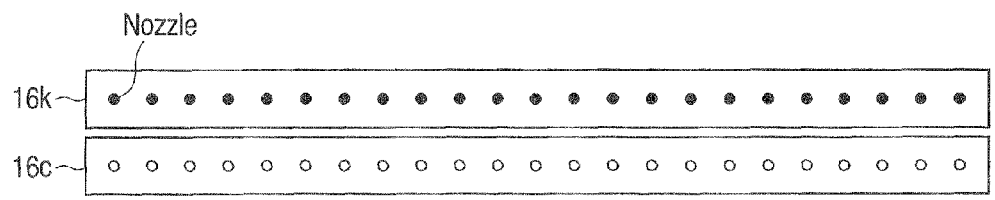
FIG. 18A is a diagram schematically showing two recording element arrays for discharging inks of different colors.
Figure 18B:
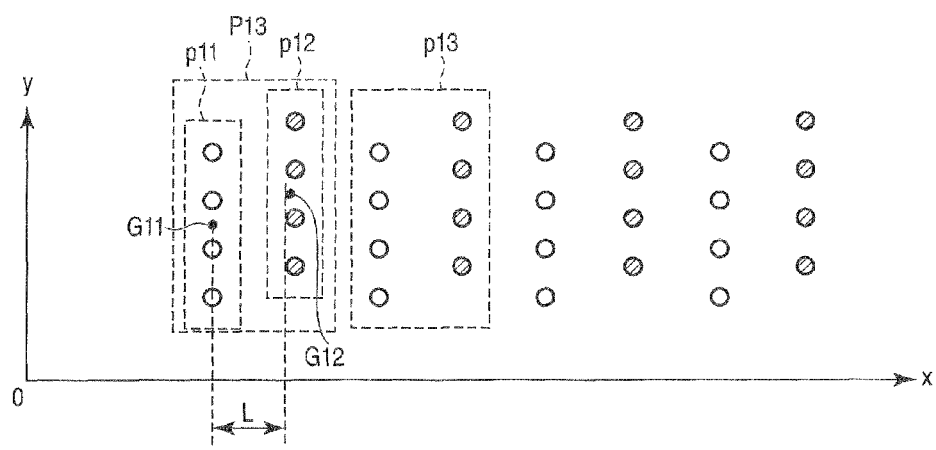
FIG. 18B is a diagram showing exemplary measuring patterns known in the art.
Figure 19:
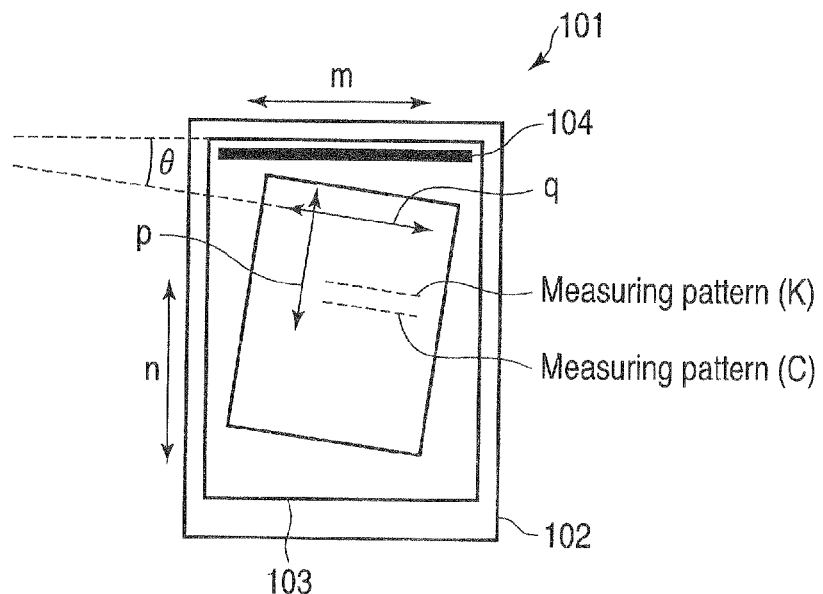
FIG. 19 is a diagram showing a positional relation between a read unit and measuring patterns.

As has been pointed out, if the measuring patterns shown in FIG. 18B are used, the distance L measured depends on the precision of the scale of the read unit 34. That is, if the scale has an error of ±E %, the distance determined will be erroneously determined to be L×(100±E)/100.

If the measuring patterns according to this embodiment are used, the distance L will be 0 in theory. Hence, the error of measuring the distance L, i.e., $\Delta L = L \times |E|/100$, can be much smaller than in the case where the patterns shown in FIG. 18B are used.

The use of the measuring patterns according to this embodiment helps to measure, at high accuracy, the relative position shift between the recording element arrays of the recording head units 16. Moreover, any measuring patterns that have gravity centers G11 and G12 having the same y-axis coordinate can serve to measure, at high accuracy, the relative position shift in the y-axis direction between the recording element arrays of the recording head units 16, notwithstanding the error the scale of the read unit 34.

In the case described above, the gravity centers G11 of the measuring pattern p11 and the gravity centers G12 of the measuring pattern p12 are identical in terms of x-axis coordinate. This embodiment is not limited to this case. The same advantage as described above can be achieved even if the measuring patterns p11 and p12 are recorded with their gravity centers G11 and G12 spaced by a distance shorter than the inter-dot distance in each measuring pattern.

The present embodiment has the following modifications.

A first modification of the second embodiment will be described below.

As specified above, the x axis and the y axis are orthogonal to each other. They need not be orthogonal, nevertheless. That is, the positions of each recording element array may be adjusted in an array-position adjusting direction which is different from the direction in which the recording medium is carried.

This means that the recording element arrays of the recording head units 16 may be inclined to the direction in which the recording medium is carried, not extending at right angles to that direction, thereby to increase the resolution during the image recording. If the x axis is inclined to the y axis as shown in FIG. 11B, the recording element arrays may extend along this inclined x axis, and the inclined x axis may be used as the array-position adjusting direction.

Figure 11A:
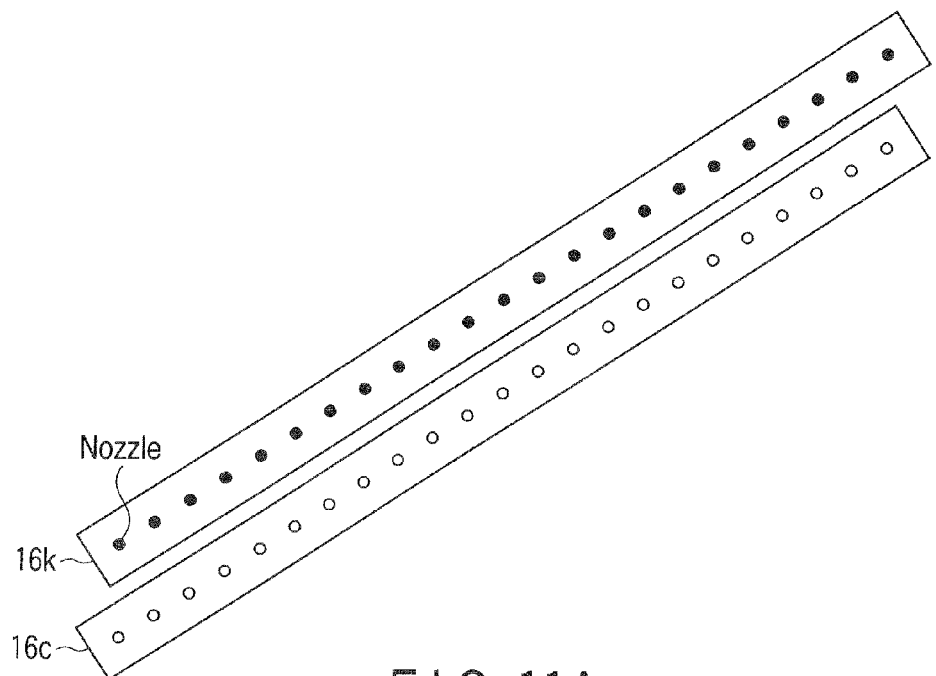
FIG. 11A is a diagram schematically showing two recording element arrays used in a first modification of the second embodiment.
Figure 11B:
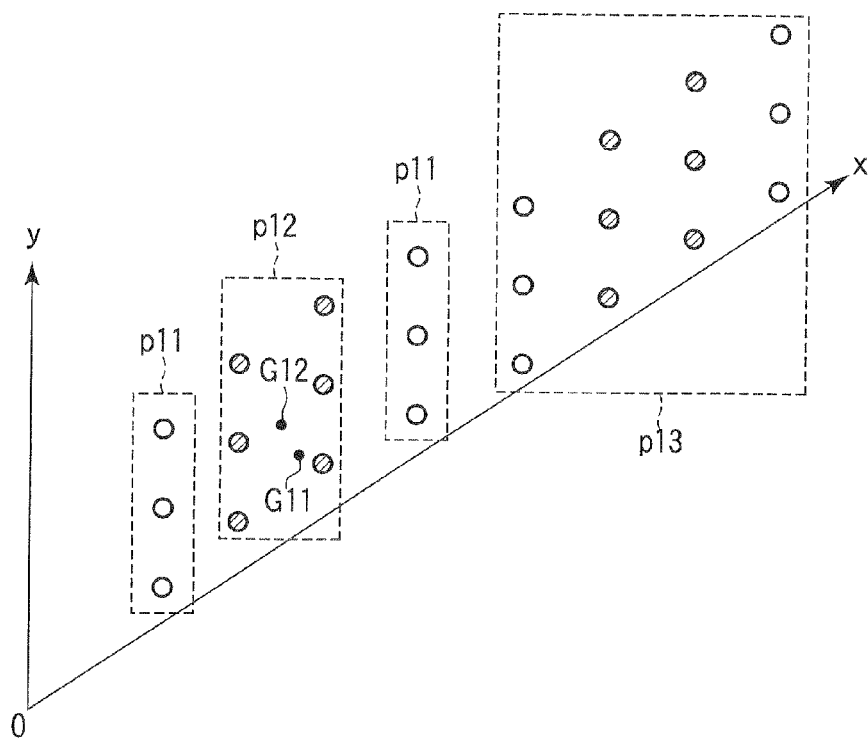
FIG. 11B is a diagram showing exemplary measuring patterns for use in the first modification of the second embodiment.

Thus, as shown in FIG. 11, the gravity centers G11 and G12 of the measuring patterns p11 and p12, respectively, are set at the same x-axis coordinate, thereby accurately measuring the distance by which to adjust the recording element arrays in position.

A second modification of the second embodiment will be described below.

As specified above, the recording element arrays of the recording head units 16 are adjusted in position in the x-axis direction. The second embodiment is not limited to this. The arrays may be adjusted in position in, for example, the direction in which they are arranged. Alternatively, the arrays may be adjusted in position in a direction orthogonal to the direction in which the recording medium is carried during the image recording.

A third modification of the second embodiment will be described below.

As described above, each recording element array is as long as, or longer than, the width of the recording medium. The second modification is not limited to this. The measuring patterns for use in this embodiment can be used, also in a serial printer in which the recording element array of the recording head mounted on a carriage is moved in the widthwise direction of the recording medium, scanning the recording medium.

In the third modification, the direction in which the recording element array mounted on the carriage scans the recording medium is regarded as y axis, in place of the axis along which the recording medium is carried. The third modification can therefore take the advantage of the measuring patterns according to the second embodiment.

A fourth modification of the second embodiment will be described below.

As described above, the relative position shift in the y-axis direction between the two measuring patterns recorded by two recording element arrays that discharge inks of different colors is measured in the second embodiment. The second modification is not limited to this. Two or more recording element arrays that discharge inks of the same color may be adjusted in position, in accordance with the relative position shift between the measuring patterns recorded in the same color by the recording element arrays.

An image recording apparatus according to a third embodiment of this invention will be described.

Figure 12:
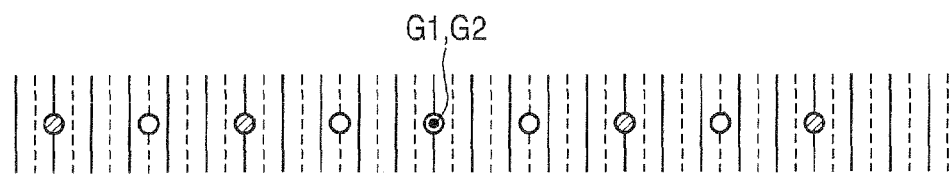
FIG. 12 is a diagram showing exemplary measuring patterns for use in a third embodiment of the invention.

FIG. 12 is a diagram showing exemplary measuring patterns for use in the third embodiment of the present invention.

Figure 21:
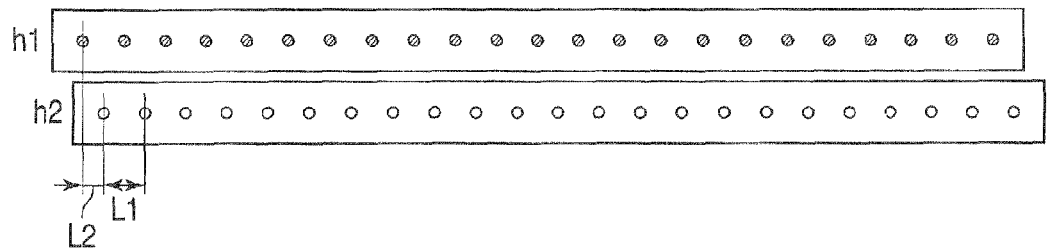
FIG. 21 is a diagram schematically showing the two recording element arrays used in a conventional image recording apparatus, which are shifted from each other in order to increase the resolution.

FIG. 21 shows the two recording element arrays h1 and h2 used in a conventional image recording apparatus, which discharge inks of the same color. The recording element arrays h1 and h2 are shifted from each other by half (½) the recording element pitch L1 in order to increase the resolution twice as much. To measure the relative position shift between the two recording element arrays in this configuration, such measuring patterns as shown in FIG. 12 are used.

As shown in FIG. 12, the dots d1 constituting measuring pattern p1 and the dots d2 constituting a measuring pattern p2 are alternatively arranged in the direction in which the recording elements are arranged. The number of dots p1 is smaller by one than that of dots p2.

Since the dots d1 and d2 are so arranged, the gravity center G1 of the measuring pattern p1 recorded by the recording element array h1 and gravity center G2 of the measuring pattern p2 recorded by the recording element array h2 are identical in terms of coordinates. Moreover, the data representing the positions of the dots formed by either recording element array is stored in a storage unit. Therefore, the dots recorded on a recording medium by a recording element array can be distinguished from those recorded on the same recording medium by any other recording element array, only if the shift of each dot from the prescribed position is equal to or less than a prescribed value.

If the gravity centers G1 and G2 are identical in terms of coordinates, the reading error will be eliminated as described above. The gravity centers G1 and G2 may assume different positions. Nonetheless, the error resulting from the fact that the direction in which the recording medium is carried during the pattern recording differs from the direction in which the line sensor of the read unit scans the medium can be small if the distance between the gravity centers G1 and G2 is short.

Figure 13:
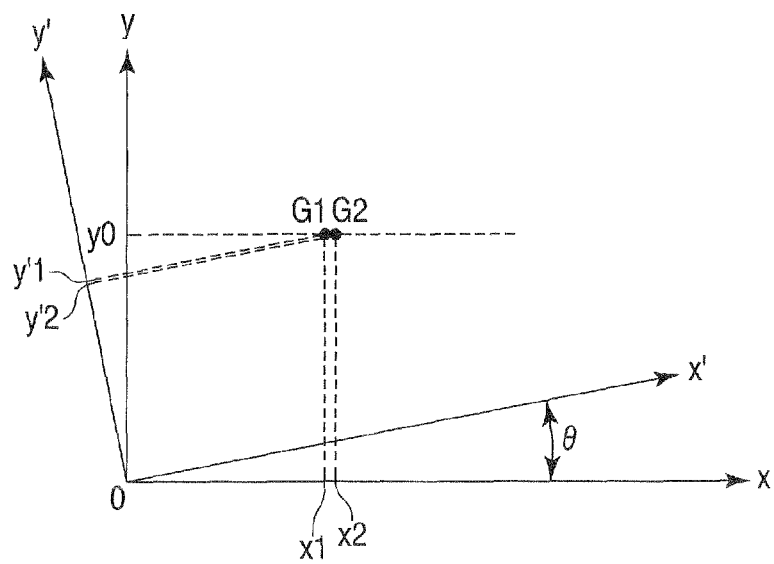
FIG. 13 is a diagram illustrating the principle of decreasing the errors made during the calculation of the position shifts, because of inclination.

Why the distance between the gravity centers G1 and G2 is short will be explained with reference to FIG. 13.

The distance between the gravity centers G1 and G2 is 0 in the xy coordinate system during the image recording. In the x'y' coordinates system that inclines by angle θ to the xy coordinate system, however, the gravity centers G1 and G2 are at point y'1 and point y'2, respectively. That is, one gravity center shifts in the y-axis direction, with respect to the other gravity center. However, this shift in the y-axis direction is very small.

Figure 22:
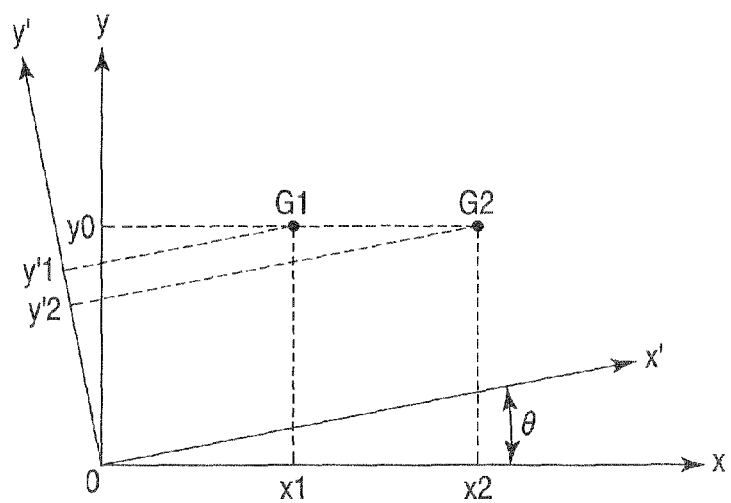
FIG. 22 is a diagram illustrating the principle of the errors made during the calculation of the position shifts, because of inclination, in the conventional image recording apparatus.

Particularly in comparison with the case of the conventional image recording apparatus, which is shown in FIG. 22, the distance between the gravity centers G1 and G2 is very small in both the xy coordinate system and the x'y' coordinate system in the xy coordinate system according to this embodiment. This holds true of not only the distance measured in the y'-axis direction, but also the x-axis direction.

In the present embodiment, two measuring patterns are recorded on the recording medium, and the gravity center of the dots constituting one pattern is identical in position to the gravity center of the dots constituting the other pattern. This can decrease the errors made during the calculation of position shifts.

An image recording apparatus according to a fourth embodiment of this invention will be described.

Figure 14:
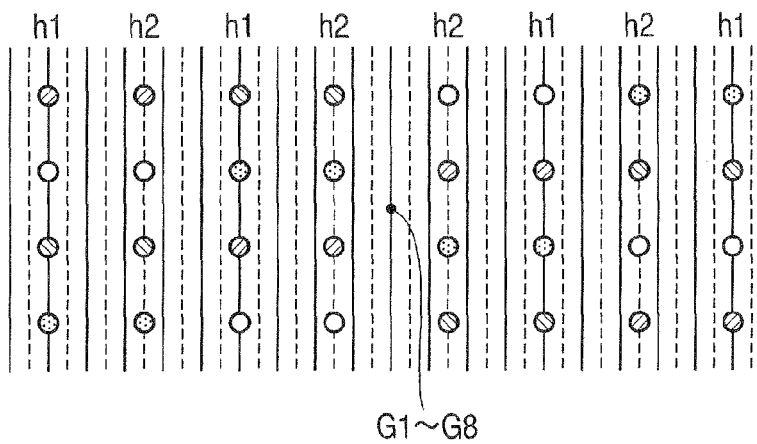
FIG. 14 is a diagram showing exemplary mea patterns for use in a fourth embodiment of this invention.

FIG. 14 shows exemplary measuring patterns for use in the fourth embodiment of the present invention. As described above, in a conventional image recording apparatus, two recording element arrays h1 and h2 that discharge inks of the same color are shifted from each other by half (½) the recording element pitch L1 in order to increase the resolution twice as much. In this embodiment, eight recording element arrays h1 to h8, for discharging four inks of different colors, are used to record eight measuring patterns.

The dots constituting the eight measuring patterns are so arranged that the gravitation centers G1 to G8 of these measuring patterns are identical in position as shown in FIG. 14.

In the present embodiment, the error in calculating the shift of each gravity center form any other gravity center can be reduced as in the second embodiment, even if the direction in which the line sensor of the read unit extends and the direction in which the sensor scans the recording medium do not align with, respectively, the direction in which the recording element arrays extend during the pattern recording and the direction orthogonal to this direction. Further, the dots constituting the eight measuring patterns are spaced apart from one another when the gravity centers G1 to G8 of the patterns are overlapped. The dots constituting each measuring pattern need not be arranged symmetrical with respect to the gravity center as shown in FIG. 14. Rather, they may be arranged symmetrical with respect to the line passing the center of gravity, as is illustrated in FIG. 12.

An image recording apparatus according to a fifth embodiment of this invention will be described.

In any one of the embodiments described above, each measuring pattern is constituted by dots that are spaced apart from one another. By contrast, the fifth embodiment uses measuring patterns, each constituted by dots that contact, forming a line as shown in FIG. 15.

Figure 15:
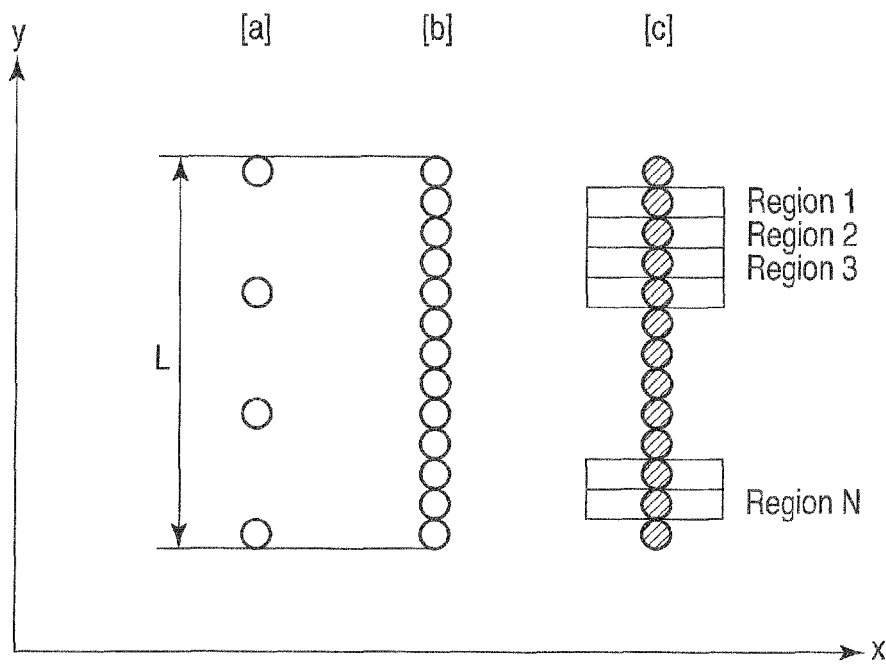
FIG. 15 is a diagram showing exemplary measuring patterns for use in a fifth embodiment of the invention.

More specifically, FIG. 15 shows three measuring patterns [a], [b] and [c]. The measuring pattern [a], which is constituted by dots spaced apart from one another, is shown for comparison with the measuring pattern [b] according to this embodiment, which is a line. The measuring pattern [c] is shown, for explaining the y coordinate for the gravity center of the measuring pattern [b] that is a line.

The measuring pattern [a] is constituted by, for example, four dots spaced apart in a region having length L as measured in the y-axis direction. The data acquired by reading this pattern [a] represents four xy coordinates of the four dots.

The measuring pattern [b] is constituted by more dots, which contact one another, defining a line in a region having length L. The y coordinate data about this pattern [b] represents the y coordinate of the gravity center for all dots constituting the pattern [b]. The measuring pattern [c], i.e., a line, is divided into regions 1 to N, which are read. Thus, the x coordinate of these regions 1 to N are determined independently. The average x coordinate value of the regions 1 to N represents the x coordinate of the measuring pattern [c] more accurately than does the average x coordinate of the four dots constituting the measuring pattern [a].

A modification of the fifth embodiment will be described.

Figure 16:
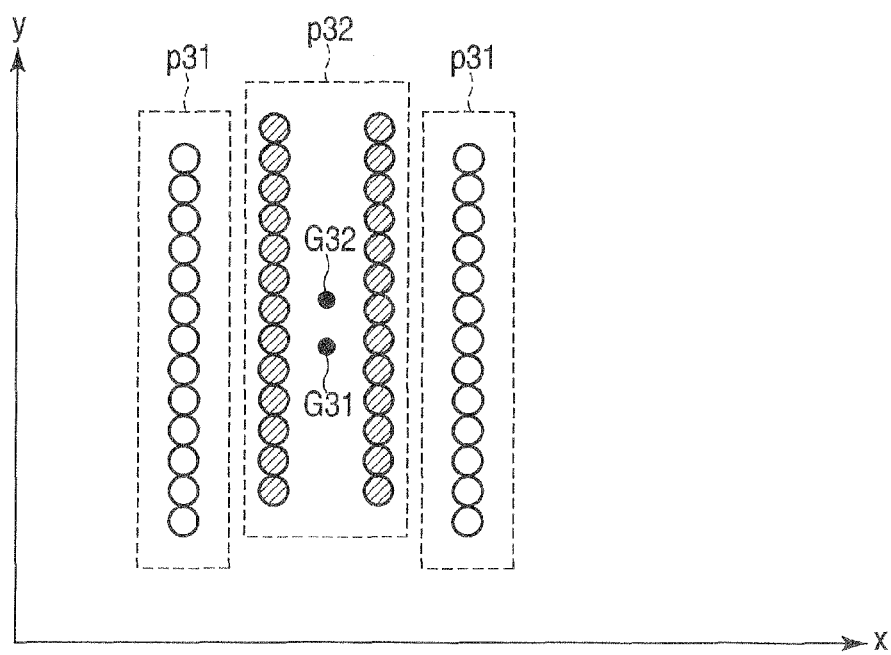
FIG. 16 is a diagram showing exemplary measuring patterns for use in a modification of the fifth embodiment of the invention.

FIG. 16 shows another exemplary measuring pattern for use in the fifth embodiment of the invention. This pattern is composed of two measuring patterns p31 and p32, each composed of two lines extending parallel to the direction in which the recording medium is carried. The lines of the pattern p31 (having gravity center G31) are spaced by a distance, and the lines of the pattern p32 (having gravity center 232) are spaced by another distance. The pattern of FIG. 16 is a combination of the measuring patterns according to the second embodiment and the principle of the measuring pattern according to the fifth embodiment.

That coordinate of the measuring pattern [c], which is on the axis perpendicular to the line, can be determined more accurately than the corresponding coordinate of any pattern constituted by spaced dots. Note that the measuring pattern [c] is greater than the measuring pattern [a] in terms of calculation load. Hence, which pattern should be used, pattern [a] or pattern [c], may be determined in accordance with which coordinate must be calculate at high accuracy.

The measuring patterns used in the fifth embodiment, which are recorded by the two recording head units 16 that should be adjusted, have the same average x coordinate value. Each line of either pattern is divided into a plurality of regions in the direction of carrying the recording medium. These regions are read, and the average of the coordinate values of these regions is used as the x coordinate of each line. The data about the x coordinate, obtained from the pattern according to this embodiment, is more accurate than the data about the x coordinate, obtained from any pattern constituted by dots spaced apart in the same area on the recording medium. Therefore, the x coordinate data can better serve to measure the relative position shift that the recording element arrays of the recording head units 16k and 16c have in the x-axis direction.

The lines of either measuring pattern extend parallel to the direction in which the recording medium is carried. Instead, the lines may be parallel to the recording element arrays. In this case, the y coordinate of each line can be accurately determined, which can help to adjust the timing of image recording more precisely.

In this embodiment, the gravity center G31 of the pattern p31 and the gravity center G32 of the pattern p32 assume the same position on the coordinate axis perpendicular to the lines. The embodiment is not limited to this, nevertheless.

Instead, the gravity centers G31 and G32 may assume the same position on the coordinate axis parallel to the lines. Since the measuring patterns used are lines, any points on the coordinate axis perpendicular to the lines can be determined at high accuracy, as pointed out before.

Since the measuring patterns used assume the same position on a certain coordinate axis, any distance on this coordinate axis can be measured, not influenced by the error the scale of the read unit 34 may have. The direction of lines may be combined with the relation between the identical coordinates, in accordance with the use of the image recording apparatus, thereby to increase the accuracy of measuring the coordinate difference that should be determined most accurately.

The measuring patterns according to this embodiment are composed of lines. The embodiment is not limited to this. Each measuring pattern may be constituted by marks of any desired shape, or by such marks and images formed by daubing selected parts of the recording medium. Alternatively, each pattern may be constituted by be composed of lines, curves, waving lines, saw-toothed lines, pulse-wave lines, or the like, which extend in two or more directions. Measuring patterns of any one of these types can achieve the advantage of this embodiment.

In any embodiment described above, the read unit 34 is not formed integral with the main unit of the image recording apparatus. Nonetheless, if the image recording apparatus has a scanner, the scanner, such as a CCD line sensor, may be arranged at the downstream of the recording head units and may scan the image formed immediately before.

In the above description, the y-axis direction is regarded as the direction of carrying the recording medium during the image recording, and the x-axis direction is regarded as the direction of carrying the recording medium. This invention is not limited to this. For example, the y-axis direction may be the lengthwise direction of the recording medium, and the x-axis direction may be the direction of carrying the recording medium.

In describing the embodiments, the terms "relative motion direction" and "array-position adjusting reaction" are used. These terms encompass the direction that will be explained below.

The relative motion direction implies the direction in which the recording medium is carried relative to the recording head (e.g., stationary recording heads of a line printer), or the direction in which the carriage is moved (in, for example, a serial printer of scan-type).

The term "array-position adjusting direction" may mean various directions, such as the direction in which the recording element arrays are arranged, the direction in which dot arrays are arranged on the recording medium, the direction in which the recording medium is carried (if the printer is a serial printer) the direct ion orthogonal to the direction in which the recording medium is carried (if the printer is a line printer), the direction orthogonal to the direction in which the recording head (carriage) is moved (if the printer is a serial printer), the direction in which the nozzle arrays of short recording head units (i.e., head units arranged in a staggered fashion) are moved relative to each other, and the direction in which the recording head units are mechanically adjusted in position in order to align the nozzles of each head unit with those of any other unit.

In the case of a line head having a plurality of short recording head units, the short recording head units may probably be adjusted in position in the direction they are arranged. In the embodiments of this invention, the recording head units are arranged in the widthwise direction of the recording medium. Nonetheless, the invention is not limited to this configuration.

The embodiments of this invention can decrease the reading error resulting if the direction in which the recording element arrays extend and the direction in which the recording medium is carried are different from the direction in which the sensor elements of the read unit are arranged and the direction in which the sensor elements scan the recording medium, respectively, during the photographing the measuring patterns recorded on the recording medium. Hence, the embodiments can provide an image recording apparatus in which the record positions can be adjusted at high precision, and also a method of calculating record position shifts.

The embodiments described above include the following inventions.

(1) An image recording apparatus including:
a plurality of recording element arrays, each composed of recording elements configured to discharge ink drops to a recording medium;
measuring pattern recording means for forming, on the recording medium, measuring patterns each constituted by a plurality of ink dots formed as the ink drops discharged from one recording element array land the recording medium;
reading means for reading the measuring patterns recorded on the recording medium, by the recording element arrays, respectively; and
record-position shift calculating means for calculating relative record shifts of the measuring patterns, from reading results acquired by the reading means,
wherein the measuring pattern recording means forms measuring patterns on the recording medium so that the ink dots constituting each measuring pattern may be spaced from one another, the ink dots constituting each measuring pattern may be spaced from the ink dots constituting any other measuring pattern, and the measuring patterns may have gravity centers identical in position on the recording medium.

(2) The image recording apparatus described in the paragraph (1), wherein the measuring pattern recording means records measuring patterns that are different from each other, in terms of the arrangement of ink dots.

(3) The image recording apparatus described in the paragraph (2), wherein the measuring pattern recording means records measuring patterns that are different from each other, in terms of the number of ink dots constituting each measuring pattern.

(4) The image recording apparatus described in the paragraph (2), wherein the measuring pattern recording means records measuring patterns that are constituted by the same number of ink dots.

(5) The image recording apparatus described in the paragraph (1), wherein the measuring pattern recording means records, on a recording medium, measuring patterns having gravity centers identical in position or spaced apart by a distance shorter than the distance by which the ink dots of each measuring pattern are spaced apart from one another.

(6) An image recording apparatus having:
a plurality of recording element arrays, each composed of recording elements configured to discharge ink drops to a recording medium;
measuring pattern recording means for forming, on the recording medium, measuring patterns each constituted by a plurality of ink dots formed as the ink drops discharged from one recording element array land the recording medium;
reading means for reading the measuring patterns recorded on the recording medium, by the recording element arrays, respectively; and record-position shift calculating means for calculating relative record shifts of the measuring patterns, from reading results acquired by the reading means, wherein the measuring pattern recording means forms measuring patterns on the recording medium so that the ink dots constituting each measuring pattern may be spaced from one another, the ink dots constituting each measuring pattern may be spaced from the ink dots constituting any other measuring pattern, and the record-position shift calculating means selects a plurality of ink dots for calculating relative record shifts of the measuring patterns, from the ink dots constituting each measuring pattern read by the reading means, so that the measuring patterns may have gravity centers identical in position.

(7) A method of calculating record position shifts, for use in an image recording apparatus, comprising:

a recording step of recording, on a recording medium, measuring patterns by using a plurality of recording element arrays, each constituted by plurality of recording elements, each of the measuring patterns being constituted by dots spaced apart from one another;

a reading step of reading the measuring patterns recorded on the recording medium; and a step of calculating relative record shifts of the measuring patterns, from results acquired in the reading step, wherein the measuring patterns are recorded on the recording medium so that the ink dots constituting each measuring pattern may be spaced from one another, the ink dots constituting each measuring pattern may be spaced from the ink dots constituting any other measuring pattern, and the measuring patterns may have gravity centers identical in position on the recording medium.

(8) A method of forming measuring patterns, comprising:

a first recording step of recording a first measuring pattern Co a recording medium by using a first recording element array constituted by plurality of recording elements; and a second recording step of recording, on the recording medium, a second measuring pattern at a position different from the position of the first measuring pattern, the second measuring pattern having a gravity center identical to the gravity center of the first measuring pattern in position on the recording medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image recording apparatus comprising:
a measuring pattern recording unit which includes a plurality of recording element arrays, each composed of recording elements configured to record ink dots on a recording medium, wherein the measuring pattern recording unit is configured to move the recording medium relative to the plurality of recording element arrays, and to drive the recording elements of each recording element array, thereby recording a prescribed plurality of measuring patterns;
a read unit configured to read the measuring patterns recorded on the recording medium; and
a record-position shift calculating unit configured to calculate relative record shifts of the measuring patterns from reading results acquired by the read unit,
wherein the measuring pattern recording unit records the plurality of measuring patterns on the recording medium such that gravity centers of the plurality of measuring patterns are identical in position on both a first coordinate axis and a second coordinate axis, the first coordinate axis being parallel to a direction in which the recording medium is moved relative to the plurality of recording element arrays, and the second coordinate axis being parallel to a direction in which positions of the recording element arrays are adjusted.

2. The image recording apparatus according to claim 1, wherein the measuring pattern recording unit records the measuring patterns on the recording medium, each spaced apart from another.

3. The image recording apparatus according to claim 1, wherein the first coordinate axis is parallel to a direction in which the recording medium is carried.

4. The image recording apparatus according to claim 1, wherein the second coordinate axis is parallel to the plurality of recording element arrays.

5. The image recording apparatus according to claim 1, wherein the measuring patterns include lines comprising dots contacting one another.

6. The image recording apparatus according to claim 5, wherein average coordinates of the measuring patterns are identical in position with respect to a coordinate axis perpendicular to the lines included in each measuring pattern.

7. The image recording apparatus according to claim 5, wherein average coordinates of the measuring patterns are identical in position with respect to a coordinate axis parallel to the lines included in each measuring pattern.

* * * * *